US008528909B2

(12) United States Patent
Gelinotte et al.

(10) Patent No.: US 8,528,909 B2

(45) Date of Patent: Sep. 10, 2013

(54) GAMING TABLE PROTECTING ANTENNAS FROM ELECTROMAGNETIC INTERFERENCES

(75) Inventors: Emmanuel Gelinotte, Savigny les Beaune (FR); Francisco Javier Moreno, San Luis, AZ (US); Gregory Gronau, Las Vegas, NV (US); Justin Woodard, Las Vegas, NV (US)

(73) Assignee: Gaming Partners International Corporation, Las Vegas, NV (US)

( * ) Notice: Subject to any disclaimer, the term of this patent is extended or adjusted under 35 U.S.C. 154(b) by 284 days.

(21) Appl. No.: 13/032,211

(22) Filed: Feb. 22, 2011

(65) Prior Publication Data

US 2011/0204565 A1 Aug. 25, 2011

Related U.S. Application Data

(60) Provisional application No. 61/306,526, filed on Feb. 21, 2010.

(51) Int. Cl.

*A63F 13/08* (2006.01)

*A63F 13/00* (2006.01)

(52) U.S. Cl.

USPC ................................ 273/309; 463/25; 463/46

(58) Field of Classification Search

USPC ..................................... 273/309; 463/25, 46

See application file for complete search history.

(56) References Cited

U.S. PATENT DOCUMENTS

| | | | | |
|---|---|---|---|---|
| 5,735,742 | A * | 4/1998 | French | 463/25 |
| 6,688,984 | B2 | 2/2004 | Cole | |
| 7,719,424 | B2 * | 5/2010 | Steil | 340/572.4 |
| 7,874,923 | B2 * | 1/2011 | Mattice et al. | 463/46 |
| 2004/0185938 | A1 | 9/2004 | Moore et al. | |
| 2005/0096137 | A1 | 5/2005 | Seelig et al. | |
| 2008/0150234 | A1 * | 6/2008 | Makieil | 273/309 |
| 2008/0180250 | A1 | 7/2008 | Steil | |
| 2009/0075723 | A1 * | 3/2009 | Richard et al. | 463/25 |
| 2009/0131151 | A1 | 5/2009 | Harris et al. | |
| 2009/0191933 | A1 | 7/2009 | French | |
| 2011/0089634 | A1 * | 4/2011 | Thorson et al. | 273/238 |

OTHER PUBLICATIONS

International Search Report and Written Opinion dated May 9, 2011.

* cited by examiner

*Primary Examiner* — Benjamin Layno

(74) *Attorney, Agent, or Firm* — Woodcock Washburn, LLP

(57) ABSTRACT

A gaming table comprising a tabletop configured to receive gaming accessories, a base connected to and configured to support the tabletop, an antenna located in the tabletop and configured to operate by at least one of, detecting, reading, writing to, tracking, or any combination thereof, the gaming accessories, and a cup shield configured to keep the antenna from being read from outside the antenna system, shield and protect it from electromagnetic and RF interferences and prevent detuning, the cup shield being located under the tabletop and aligned with the antenna. The base can include a side wall connected to a back panel, a shelf connected to the side wall and the back panel, and a pipe configured to isolate, insulate or shield a plurality of wires, the back panel and the shelf having a plurality of openings configured to ventilate heat from inside the base to outside of the table.

21 Claims, 7 Drawing Sheets

GAMING TABLE PROTECTING ANTENNAS FROM ELECTROMAGNETIC INTERFERENCES

BACKGROUND

1. Field of the Disclosure

The present invention relates to a gaming table for use with gaming accessories such as gaming chips, plaques, playing cards, and dice, in casinos and gaming rooms. In particular, the present invention relates to a radio frequency identification (RFID) gaming table having cup shields configured to shield RFID antennas and to protect the RFID antennas from disturbances or interferences caused by electrical equipment, devices and wirings located in the table or near the table, pipes configured to insulate the electrical wirings in the base of the table, and a plurality of holes located in the shelves elf the base configured to ventilate heat from inside the base.

2. Discussion of Background Information

As compared to slot or video type games, traditional table games offer greater excitement for some players, group play, and often attract big money players, which can result in larger profit margins for the casino. Slots or video type games, however, often integrate a player tracking system that allows a computerized system to monitor a player's participation, such as how often a player plays and how much a particular player wagers. Furthermore, electronic gaming machines, such as slot or video type machines, accurately detect wagers and payouts, and thus are very efficient at preventing cheating.

In a table game environment, however, it is often difficult to track how much money a player wagers, and thus it is likewise difficult to accurately provide complimentary gifts or reward good customers to encourage a return to a particular property. Prior gaming tables use gaming tokens or chips embedded with RFID to track a player's betting for this purpose.

These prior gaming tables with the gaming chips are pervasively used in casino and gaming rooms for table games such as blackjack, poker, baccarat, craps and roulette. Particularly, these tables are provided with a RFID system including at least one RFID antenna for tracking and reading the gaming chips during a table game. These gaming tables further include low frequency and high frequency RFID chips, low and high frequency RFID readers, table layouts, playing cards, dice, gaming furniture, roulette wheels, table accessories, and other products that are used for casino table games.

However, even with these prior art bet tracking techniques, numerous wagering aspects may be missed or unmonitored, as discussed below. With the growing use of electronic technology for chip verification and tracking, today's gaming tables require more electronic equipment, devices and wirings to be installed in them. As such, these electrical devices and wirings may interfere with the RFID antenna, causing malfunctions in the RFID tracking system. Further, the electrical devices and wirings emit heat inside the base of the table, such that the performance of the electronic equipment and RF signals and receivers can be affected.

Accordingly, one drawback to these prior art systems is that existing RFID-type systems may not be able to accurately track every token due to interference caused by electronic equipment and wirings, particularly when numerous tokens are stacked. In addition, these prior art systems may suffer from inter antenna interferences if RFID antennas are spaced too closely together for games that have multiple and independent betting options per player seat, such as, for example, the game of baccarat. As a result, table layouts require sufficient spacing between antennas, which in turn may prevent desired felt layout or prevent presentation of the desired game.

Thus, there is a need for a gaming table designed and built especially to accommodate the electronic equipment that is increasingly required on gaming tables. Also, there is need for a gaming table configured to allow for ventilation and cooling of electronic equipment, to eliminate degradation in performance of the RF signals and electronic equipment, and to include specially-built areas for a shuffler and a bill validator that are ergonomically placed for dealer convenience and comfort while preventing any possible cheating.

BRIEF SUMMARY

The present invention is directed to a gaming table that satisfies the needs or remedies the problems identified above. This table bears an innovative and unique design that will allow electronic equipment to perform at its fullest potential, while also allowing the table to be beautiful and fully functional.

In accordance with one or more aspects of the present invention, a gaming table is provided that can include: a tabletop configured to receive gaming accessories; a base connected to and configured to support the tabletop; a plurality of electrical wires located at least one of; within the tabletop, near the tabletop, within the base, near the base, or any combination thereof, to provide power such as alternating current (AC) to electrical components; at least one antenna configured to operate by at least one of; detecting, reading, writing to, tracking, or any combination thereof; the gaming accessories; at least one RFID wire or cable to support RFID system functions, e.g., the functions of the at least one antenna; at least one data transmission wire or cable to support computer hardware and software components, e.g., for data communications, for connection to a universal serial bus (USB), network connection Ethernet, etc.; the gaming accessories; and at least one cup shield configured to shield and protect the at least one antenna from electromagnetic interferences (EMI) and radio frequency interferences (RFI), to prevent "reading" of the antenna (i.e., interception of the antenna's signals from outside the RFID system) so as to prevent cheating, and to aid against detuning of the antenna, the cup shield being located underneath the tabletop. Additionally, the cup shield can include a ferrite plate configured to protect the antenna from magnetic interferences.

In accordance with one or more embodiments of the present invention, the gaming table can include a bill validator located within reach of a dealer, a RFID float tray configured to store the gaming accessories, the REID float tray being located on the tabletop, and a card shuffler located on the tabletop and within reach of the dealer.

In accordance with one or more embodiments of the present invention, the gaming table can include a cup shield comprising a cup base having at least one hole configured to assist in tuning the antenna and a lip configured to assist in securing the cup shield to the tabletop, the lip having a neckline configured to receive a cable or wire in the cup shield. The inside of the cup can be painted or have a coating that can help to shield an antenna from electromagnetic and RF interferences, as well as prevent reading of the antenna from underneath the table to thereby prevent cheating, and to prevent detuning of the antenna.

In accordance with one or more embodiments of the present invention, the gaming table can include a cup shield configured to prevent counterfeiting during a game.

In accordance with one or more embodiments of the present invention, the gaming table can include a cup shield configured to protect an antenna from being detuned.

In accordance with one or more embodiments of the present invention, the gaming table can include a cup shield configured to protect an antenna against interference from power generation, such as AC harmonics and magnetic disturbances.

In accordance with one or more embodiments of the present invention, the gaming table can include a base comprising at least one side wall connected to a back panel, at least one shelf connected to the at least one side wall and the back panel, and at least one pipe configured to at least one of isolate, insulate, shield, or any combination thereof, a plurality of electrical wires. The back panel and the at least one shelf also can have a plurality of openings configured to ventilate heat from inside the base to the outside of the table. The at least one pipe can comprise at least one first pipe configured to at least one of, isolate, insulate, shield, or any combination thereof, AC wirings or cables, at least one second pipe configured to at least one of, isolate, insulate, shield, or any combination thereof, RFID wirings or cables, and at least one third pipe configured to at least one of, isolate, insulate, shield, or any combination thereof, data wirings or cables. The at least one pipe can be installed in any configuration for ease of use, accessibility to and protection of the wires, and aesthetic appearance, e.g., perpendicular to the at least one shelf.

In accordance with one or more embodiments of the present invention, the gaming table can include a tabletop comprising a top base assembled with a top insert and a hardwood strip placed on a dealer side, an inlay attached to the top base, the inlay having at least one rail drink opening having at least one cup holder, and a dealer bar attached to the hardwood strip. The top insert can have at least one cut configured to receive at least one of a RFID float tray, a bill validator, a liquid crystal display (LCD) module, an antenna, or any combination thereof. The top insert can be painted or coated on its reverse side with a pre-formulated paint or coating to assist in protecting an antenna against electromagnetic interferences, and to limit the reading field of the antenna without closing a loop around the antenna or detuning it.

In accordance with one or more embodiments of the present invention, the gaming table can include at least one antenna comprising at least one first antenna and at least one second antenna. The at least one first antenna can be installed inside the tabletop, e.g., by way of a countersink in the tabletop base and being covered by the tabletop insert, and can be a round antenna. Further, the at least one first antenna can include at least six antennas. The at least one second antenna can be located under the RFID float tray.

In accordance with one or more embodiments of the present invention, the gaming table can care include gaming accessories comprising at least one of, gaming chips, playing cards, dice, or any combination thereof.

In accordance with one or more embodiments of the present invention, the gaming table can include: at least one electrical wire or cable which can cause at least one of electromagnetic interference, radio frequency interference, magnetic interference, or any combination thereof; at least one RFID cable or wire to support functions of a RFID system; and at least one data transmission cable or wire to support data transmission.

In accordance with one or more embodiments of the present invention, a gaming table is provided that can include: a tabletop configured to receive gaming accessories; a base connected to and configured to support the tabletop; a plurality of electrical wires located at least one of within the tabletop, near the tabletop, within the base, near the base, or any combination thereof; at least one antenna configured to operate by at least one of; detecting, reading, writing to, tracking, or any combination thereof; and the gaming accessories, the base including at least one side wall connected to a back panel, at least one shelf connected to the side wall and the back panel, and at least one pipe configured to at least one of, isolate, insulate, shield, or any combination thereof, the plurality of electrical wires, the back panel and the at least one shelf having a plurality of openings configured to ventilate heat from inside the base to outside of the table.

In accordance with one or more embodiments of the present invention, a gaming table is provided that can include: a tabletop configured to receive gaming accessories; a base connected to and configured to support the tabletop; a plurality of electrical wires located at least one of; within the tabletop, near the tabletop, within the base, near the base, or any combination thereof; and at least one antenna configured to operate by at least one of, detecting, reading, writing to, tracking, or any combination thereof, the gaming accessories, wherein the tabletop is painted with a pre-formulated paint or coating to protect the at least one antenna against electromagnetic interferences as well as to limit the reading field of the antenna without looping or detuning the antenna.

In accordance with one or more embodiments of the present invention, a gaming table is provided that can include a tabletop configured to receive gaming accessories, a barrel base connected to and configured to support the tabletop, a first pipe located in the barrel base, the first pipe being configured to at least one of, isolate, insulate, shield, or any combination thereof, AC wirings, a second pipe being located in the barrel base, the second pipe being configured to at least one of isolate, insulate, shield, or any combination thereof, RFID wirings, and a third pipe located in the barrel base, the third pipe being configured to at least one of, isolate, insulate, shield, or any combination thereof, data wirings. The gaming table also can include six round antennas configured to operate by at least one of, detecting, reading, writing to, tracking, or any combination thereof, the gaming accessories, and each of the six round antennas can be shielded by a cup shield, configured to shield and protect each of the six round antennas from RF and electromagnetic interferences, to aid against detuning, and to prevent the antennas from being read from outside the RFID system so as to prevent cheating. The cup shield can be located in any position necessary to shield the antenna, e.g., fastened to the underside of the tabletop and aligned to the position of the antenna. The gaming table also can include a bill validator located in the barrel base and within reach of a dealer, a RFID float tray configured to store information about the gaming accessories, the RFID float tray being located on the tabletop, and a card shuffler located on the tabletop and within reach of the dealer. The barrel base can comprise a round side wall connected to a back panel, a top shelf connected to the round side all and the back panel, a middle shelf connected to the side wall and the back panel, and a bottom shelf connected to the round side wall and the back panel. The middle shelf and the bottom shelf can have a plurality of holes configured to ventilate heat from inside the barrel base to the outside of the table, while the cup shield can comprise a cup base having one or two holes configured to assist in tuning an antenna and a lip configured to assist in securing the cup shield to the tabletop. The lip can have a neckline configured to receive a cable in the cup shield, and the inside of the cup can be painted or coated with a pre-formulated paint or coating to protect an antenna from electromagnetic and RF interferences, to keep the antenna from being read under the table, and aid against detuning. The tabletop also can comprise a top base assembled with a top insert and at least one strip placed on a dealer side, an inlay attached to the top base, the inlay including one or more rail drink openings, each rail drink opening having at least one cup holder, and a dealer bar attached to the strip. The top insert can be painted or coated on its reverse side with a pre-formulated paint or coating to limit the reading field of the at least one antenna, so that accessories within the reading field of one antenna are not read by another antenna that is closely situated.

BRIEF DESCRIPTION OF THE DRAWINGS

These and other features, aspects and advantages of the present invention will become better understood with regard to the following description, appended claims, and accompanying drawings, where:

DETAILED DESCRIPTION

The term "gaming accessories" can mean any type of gaming chips, gaming tokens, playing cards, dice, gaming plaques, gaming disks or gaming plates. A RFID gaming chip can be embedded in any of these accessories, such that the gaming accessories can be detected, read, written to or tracked by a RFID antenna.

The term "cup shield" can mean a structure configured to shield and protect the RFID antenna from being read underneath the table to prevent cheating, against electromagnetic (EM) and radio frequency (RF) interferences caused by any kind of electrical equipment, devices or wirings, and to aid against detuning.

Figure 1:
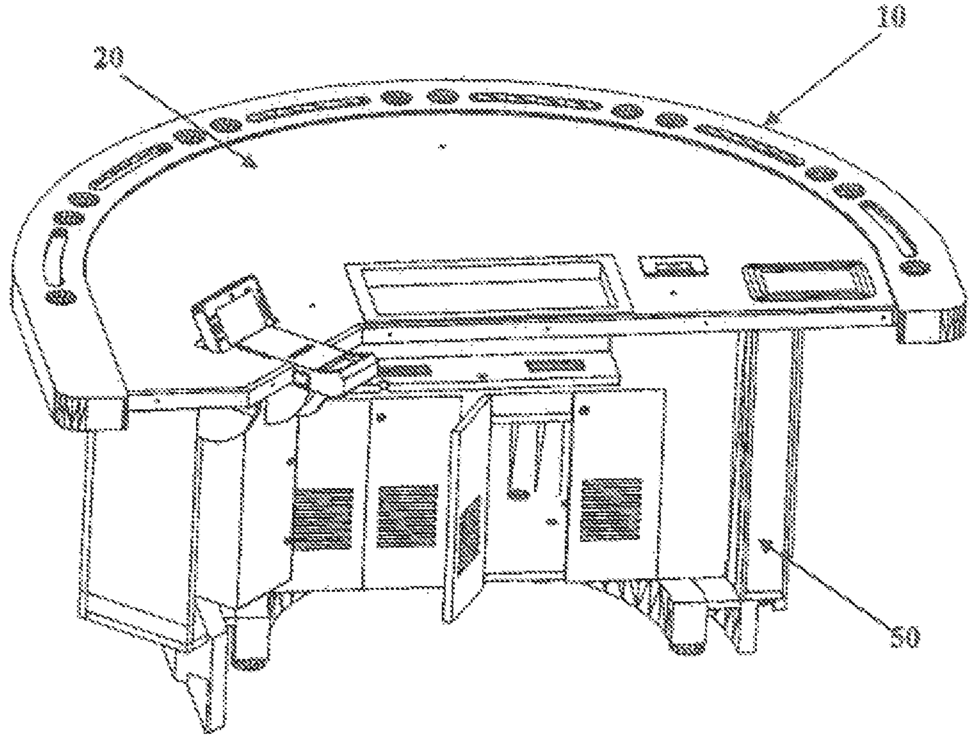
FIG. 1 shows a perspective view of a gaming table in accordance to one or more embodiments of the present invention.

As shown in FIG. 1, a gaming table 10 in accordance to one or more embodiments of the present invention is shown. In the illustrated embodiment, the gaming table 10 may have a tabletop 20 and a base 50 connected thereto. Base 50 is sufficiently configured so as to support the tabletop 20. In one non-limiting embodiment, the base 50 may have a barrel configuration. In another embodiment, the tabletop 20 may have a semicircular shape, such that table game players may be positioned around the tabletop 20 and within reach of a dealer. Other shapes of the gaming table 10—and more particularly the tabletop 20 and the base 50—are possible, such as an oval, a circle, a square, a rectangle and the like. The gaming table may also be constructed with an open base instead of a closed barrel base, such as one that has a stretcher bar that ties two legs together. The open base may then be configured to store RFID and computer hardware.

Figure 2A:
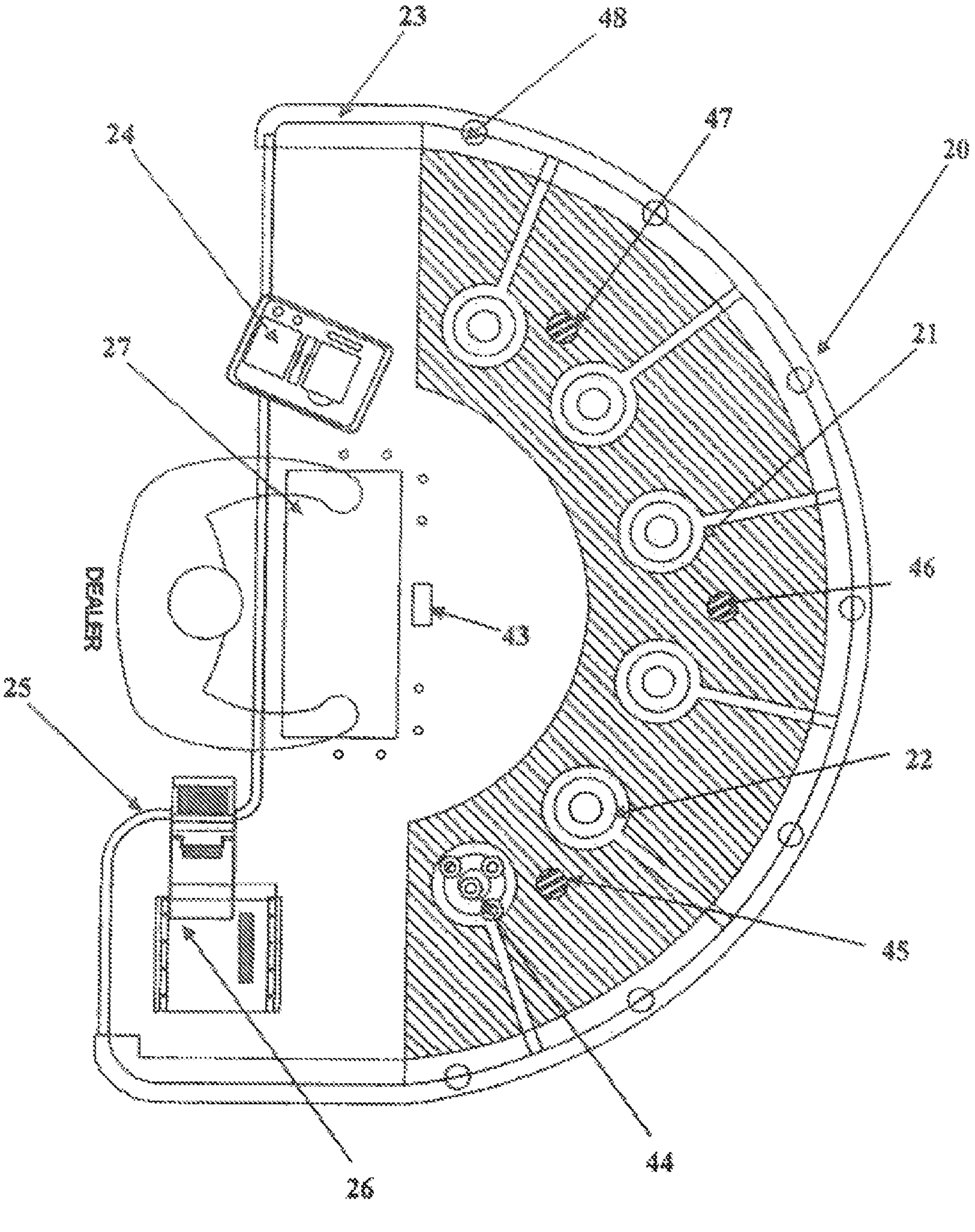
FIG. 2A shows a plan view of a gaming table in accordance to one or more embodiments of the present invention, illustrating a layout of the tabletop.
Figure 2B:
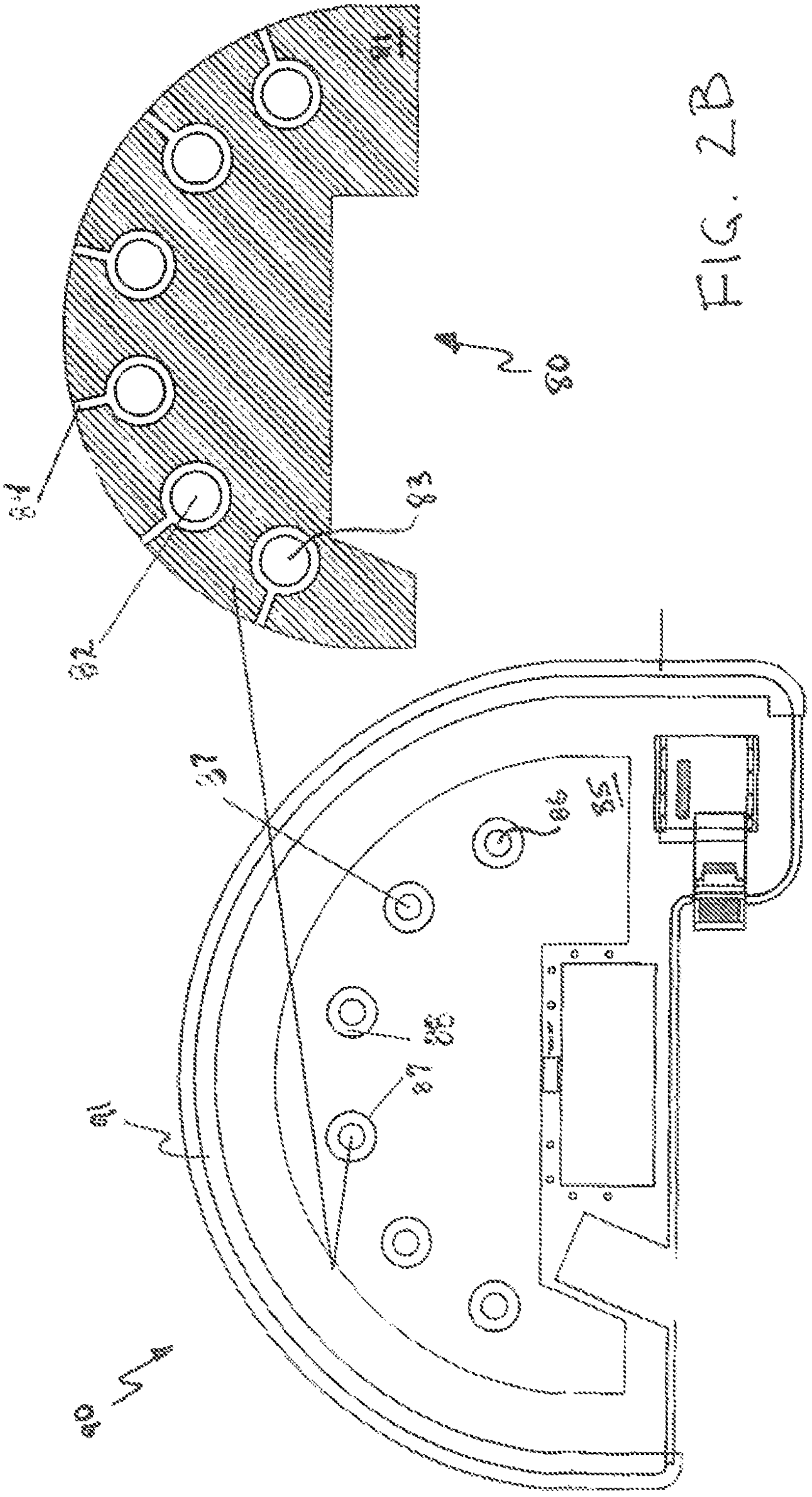
FIG. 2B shows a plan view of an alternate embodiment of a tabletop having an exchangeable insert bed for receiving a table top insert thereon.
Figure 2C:
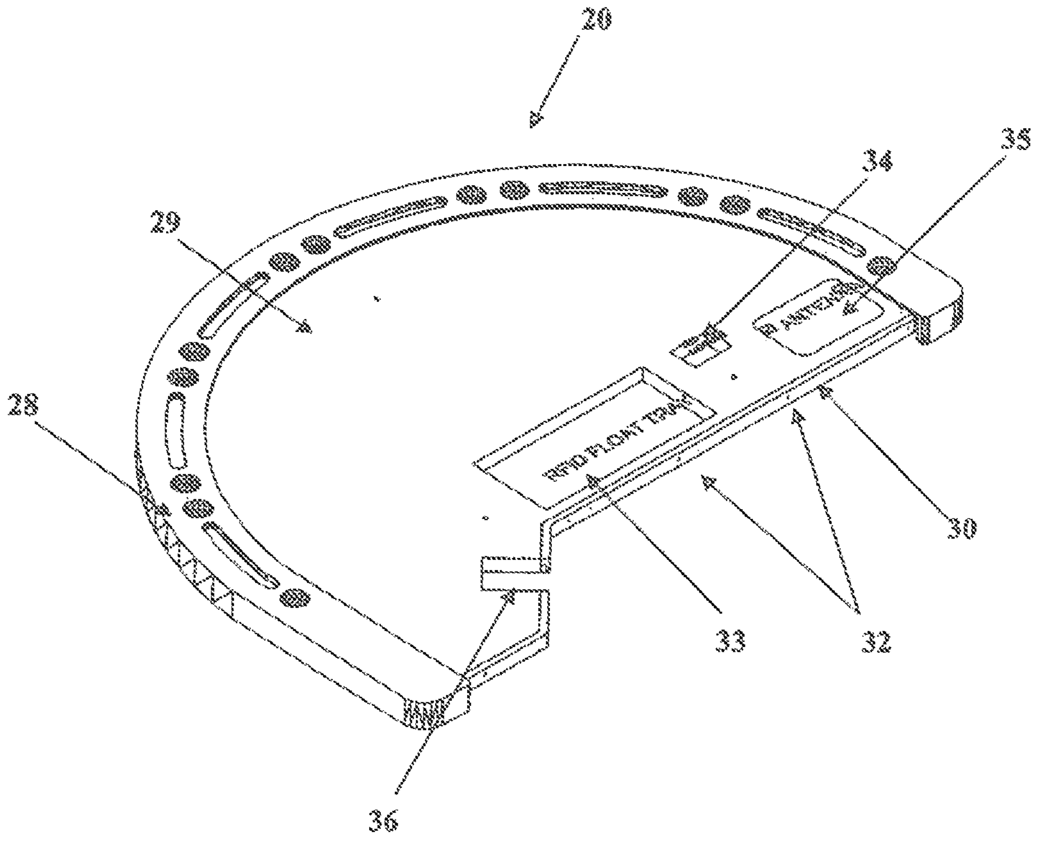
FIG. 2C shows a perspective view of a tabletop in accordance to one or more embodiments of the present invention, illustrating a different layout from that of the tabletop shown in FIG. 2A.

As shown in FIGS. 2A, 2B and 2C, the top surface of tabletop 20 may be configured to receive gaming accessories 44 such as gaming chips, plaques, playing cards, dice and disks to name a few examples. The tabletop 20 may include a RFID antenna 22 configured to operate by detecting, reading, writing to, and/or tracking the gaming accessories. RFID 22 may be configured to perform any combination of the listed functions. As shown in FIG. 2A, as an illustration, the tabletop may have, but is not limited to, six antennas, such that six people may play a table game at the same time. One of ordinary skill in the art will appreciate that any number and combination of antennas may be positioned within the tabletop and still fall within the scope and spirit of the present invention.

The gaming table may have AC (alternating current) cables and may also have power supplies (or transformers) to power computers, displays, RFID readers, shuffling a machines, bill acceptors and validators, or any components that require power. Piping may be added to secure and protect AC cables, data cables, and antenna (RFID) cables, to keep them separated from each other and from equipment in the table. The piping may be insulated, or may be painted or coated with a pre-formulated paint or coating for better efficiency in preventing strong electromagnetic and harmonic disturbances caused by the AC cables to interfere with the RFID antennas.

The tabletop 20 may include a cup shield 21 that shields the RFID antenna 22 from the electromagnetic and harmonic disturbances caused by AC cables or the like. In this particular configuration, the RFID antenna 22 is located within range of certain disturbances but is shielded by the cup shield 21 so that antenna 22 is not detuned or looped. The gaming table 10 may also include different kinds of electrical equipment, devices and wirings that may interfere with the proper function of RFID antenna 22. In particular, the table may include a plurality of electrical wires 45, 46 and 47 located within or near the tabletop 20, or within or near the base 50. For example, the gaming table 10 may include AC wiring 45 and RFID wiring 46 for a RFID system. The RFID system is not limited to just the RFID wiring 46, but may also include the RFID antenna 22, and data wiring 47 for a Universal Serial Bus (USB) and other equipment for data transmission and communications.

Electrical equipment and wirings are capable of generating electromagnetic or harmonic interferences with the RFID antenna 22, such that the RFID antenna 22 may incorrectly read RFID gaming chips, RFID playing cards or other accessories. As such, a cup shield 21 may be provided to shield and protect the RFID antenna 22 from electromagnetic interference (EMI) caused by the electrical equipment, devices and wirings located in the base 50. Also, the cup shield 21 is configured to protect the RFID antenna 22 against radio frequency interference (RFI), such as AC harmonic radiation. Furthermore, in one particular embodiment, the cup shield 21 prevents the antenna from being read under the table, so as to discourage counterfeiting during a game. The cup shield 21 also may be configured to protect the RFID antenna 22 from being detuned, as further discussed below.

In the illustrated embodiment, the gaming table 10 includes a bill validator 26 located on the tabletop 20 and within reach of the dealer. As shown, bill validator 26 is installed in both the base 50 and the tabletop 20. The bill validator 26 may be installed within a cage and constructed of any appropriate material, e.g., plywood and aluminum, on the right or left side of the dealer. The tabletop 20 may include an RFID float tray 27 configured to store the gaming accessories 44. In the illustrated embodiment, the RFID float tray 27 is located on the top surface of tabletop 20 and within reach of the dealer, however, any configuration of the RFID float tray may be used without departing from the scope and spirit of the present invention.

The tabletop 20 may include a card shuffler 24 located on the tabletop 20 and within reach of the dealer, the card shuffler 24 is typically installed in the base 50 and the tabletop 20. The card shuffler 24 may be located on the right or left side of the dealer. Furthermore, the tabletop 20 may include an LCD display 43 located within sight of the dealer such as in front of, on the right side or on the left side of the dealer's position.

The tabletop 20 may include a top base 28 assembled with a top insert 29 and a strip 30 placed on a dealer side. An inlay 23 is attached to the top base 28. The inlay 23 includes rail drink openings with cup holders 48 and a dealer bar 25 attached to the strip 30. The top base 28 and the top insert 29 both may be assembled together in any appropriate fashion, e.g., by using screws (not shown) or other fastening means. On the dealer side, the strip 30 may be fastened in any practical manner, e.g., with metallic inserts 32 or the like. The top insert 29 may have any one of the following: a cutout 33 for receiving the RFID float tray 27, a cutout 36 for receiving the bill validator 26, a cutout 34 for a LCD module including the LCD monitor 43, and a cutout 35 for an antenna configured for testing, reading, writing to or tracking the gaming accessories 44.

In one particular embodiment, the top insert 29 is coated or painted with a pre-formulated coating or paint to limit the reading field produced by the RFID antenna 22. This specially pre-formulated coating or paint may also be applied to the interior of cup shield 21. In such a configuration, the coating or paint prevents antenna from being read under the table so as to prevent cheating, prevents the antenna 22 from being detuned, and protects the RFID system from radio frequency interference and electromagnetic interference. FIG. 2A shows the cross hatched portion identifying the top insert 29 painted with the pre-formulated paint. In one particular embodiment, the pre-formulated coating or paint is a water-based, conductive paint, with a copper composition. In another embodiment, the pre-formulated coating or paint comprises a water-based shielding material that is interspersed with copper and/or ferrite particles. The density and viscosity of the pre-formulated paint may be defined in an advantageous way such that the paint may be easily applied on wood and plastic materials to prevent detuning the antennas. Typically, the paint may be applied in all areas around the antennas without creating a closed loop.

For the manufacture of the inlay 23, any appropriate hard material may be used such as wood, plastic, composites and the like of, for example, 1¼" width. The inlay 23 may be assembled with several components of rail drink openings cut and prepared by using a computer numerical control (CNC) machine. After the inlay 23 is assembled, it is returned to the CNC machine for a final radial cut, and then it may be sent to a sanding and staining area to apply a layer of clear polyester, e.g., Duratek 904-045, combined with an organic liquid hardener, e.g., Superox Peroxide type "D," each day for 6 days. Between each paint application to the inlay 23, the hard wood may be sanded with sandpaper, e.g., #220. The inlay 23 having the rail drink openings may then be secured to the tabletop with appropriate fasteners, e.g., 1¼" screws.

The dealer bar 25 may be made of oak, mahogany or other hard material with dimensions of, for example, ¾"×1½". The same finish process as discussed above for the inlay 23 may be repeated for making the dealer bar 25. The dealer bar 25 may be secured to the tabletop 20 using appropriate fasteners, e.g., seven 1½"×¼" flat head bolts with shiny metallic finish. Other dimensions and ways of securing together the components of the gaming table are possible.

The gaming table 10 may include another antenna (not shown) for the RFID float tray 27, such that this antenna may be located under the RFID float tray 27.

FIG. 2B illustrates an alternate embodiment of tabletop 90. In the illustrated embodiment, tabletop 90 is a two-piece construction comprising a top base 91 having an exchangeable insert bed 85 for receiving a table top exchangeable insert 80. Similar to the top inset of tabletop 20 illustrated and described with respect to FIG. 2A, exchangeable insert 80 is coated with a pre-formulated shielding coating or paint 81 to limit the reading field produced by the plurality of RFID antennas located on the RFID antenna beds 86, 87, 88, 89 in the tabletop 90. FIG. 2B shows the cross-hatched portion 81 identifying the pre-formulated paint. In one particular embodiment of exchangeable insert 80, the pre-formulated coating or paint is a water-based, conductive paint, with a copper composition. In another embodiment, the pre-formulated coating or paint comprises a water-based shielding material that is interspersed with copper and/or ferrite particles.

In the particular illustrated embodiment of FIG. 2B, exchangeable insert bed 85 is a recessed area on the surface of the top base 91 of tabletop 90 and is configured to receive the table top exchangeable insert 80 within its interior. In operation, the table top exchangeable insert 80 is placed on the top surface of tabletop 90 within the interior of the exchangeable insert bed 85. A plurality of hollow circle members 82, 83, 84 are arranged in table top exchangeable insert 80 to accommodate the plurality of RFID antenna beds 86, 87, 88, 89 in the tabletop 90. Typically, the depth of the exchangeable insert bed 85 matches the thickness of the table top exchangeable insert 80.

The diameter of the plurality of hollow circle members 82, 83, 84 are sized to fit the diameter of the plurality of RFID antenna beds 86, 87, 88, 89 within the interior of the hollow circle members. The thickness of the table top exchangeable insert 80 is sized so that the surface of exchangeable insert 80 is coplanar with the surface of the RFID antenna beds 86, 87, 88, 89. In one embodiment, the thickness of the table top exchangeable insert 80 is ¾", however, one skilled in the art can appreciate that any suitable thickness may be used for the table top exchangeable insert 80 without departing from the scope and spirit of the present invention.

Figure 3A:
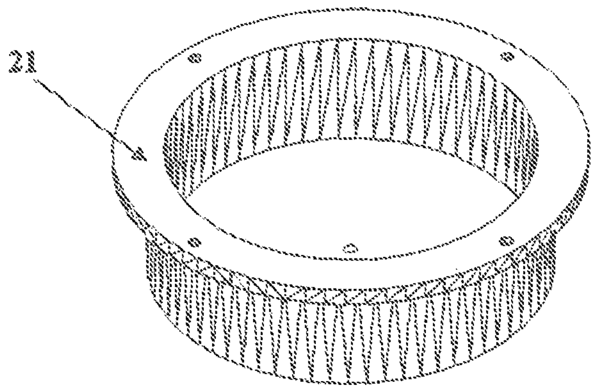
FIG. 3A shows a perspective view of a cup shield in accordance to one or more embodiments of the present invention.
Figure 3B:
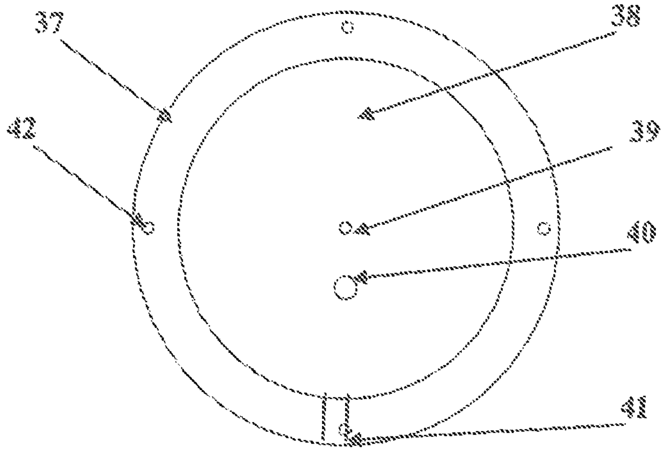
FIG. 3B shows a plan view of the cup shield.
Figure 3C:
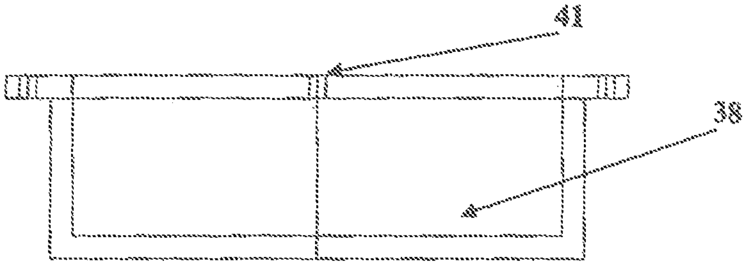
FIG. 3C shows a front view of the cup shield.

As shown in the illustrated embodiment illustrated in FIGS. 3A, 3B and 3C, the cup shield 21 includes a cup base 38 and a lip 37, configured such that the RFID antenna 22 is shielded by the cup base 38. As such, the RFID antenna 22 may be installed, for example, inside the tabletop, e.g., in a countersink, and the cup shield 21 may be oriented in alignment with the RFID antenna 22 and secured, e.g., fastened to the underside of the tabletop beneath the RFID antenna 22. In such a configuration, the cup shield 21 prevents disturbances coming from the neighboring environment (wirings, electronic devices radiations, etc.), and offers a good solution against detuning of the RFID antenna 22 due to metals and other electromagnetic sources. While the cup shield 21 may be coated inside with the pre-formulated paint or coating, it may alternatively include a ferrite plate as a more efficient, although more costly, solution to shielding the RFID antenna 22 against electromagnetic interferences. While the MD antenna 22 is illustrated as a round antenna, other shapes of antennas (e.g., square, rectangle, etc.) may be used, with the corresponding cup shield 21 having the corresponding shape. A minimum distance of separation, for example, one inch, is needed between the antenna plan of the RFID antenna and the uncoated and unpainted lip of the cup shield 21.

In the illustrated embodiment, cup base 38 may have a smaller hole 39 at the center and a bigger hole 40 between the center and the circumference. The illustrated embodiment is for illustration purposes only and is in no way meant to be limiting of the installation of the cup. The smaller hole 39 is configured to assist in installing the cup shield 21 and in alignment with the RFID antenna 22. For other shapes of cup shields, two or more small holes may be used to help with installation of the cup shields and indexing the position with the antennas. While the smaller hole 39 may be configured to assist in installing the cup shield 21, the bigger hole 40 is utilized to assist in tuning the RFID antenna 22 with a screwdriver or other appropriate implement. Continuing with the illustrated embodiment, the lip 37 may have holes 42 configured so as to assist in securing the cup shield 21 to, e.g., the underside of the tabletop 20. Neckline 41 may be configured to receive a cable in the cup shield 21. The outside of the cup base 38 may be painted to protect the RFID antenna 22 from electromagnetic interferences or AC harmonics and also to prevent counterfeiting during a game.

Figure 4:
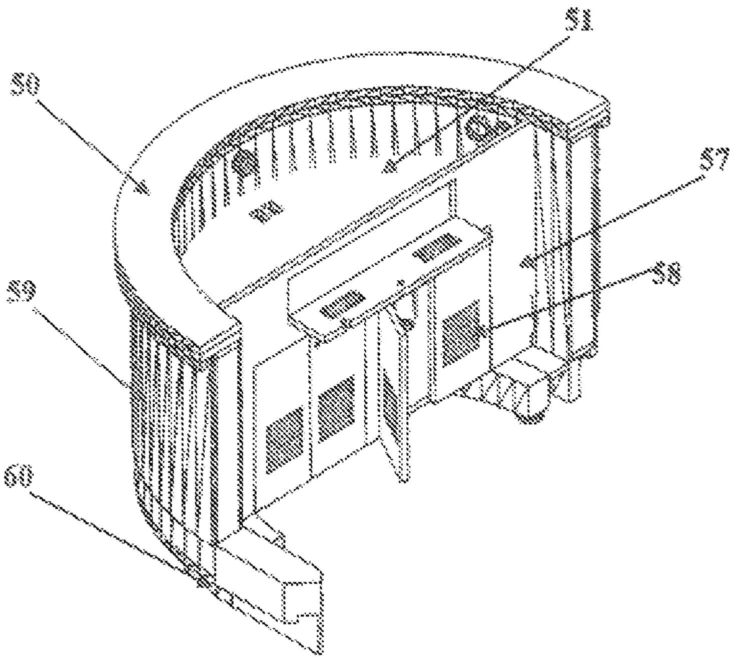
FIG. 4 shows a perspective view of a base of the gaming table in accordance to one or more embodiments of the present invention.

As shown in FIG. 4, the gaming table 10 may include the base 50. In the illustrated embodiment, the base 50 includes a top shelf 51 connected to a back panel 57, a circular side wall 59, a middle shelf 52 (shown in FIG. 6B), bottom shelf 53 (shown in FIG. 6C), and a support 60. The back panel 57 has a folding door with the openings 58 and the middle and bottom shelves may have a plurality of holes. The openings and the holes are configured to ventilate heat from inside the base to outside of the table. The back panel may have, for example, a laminate plastic finish. The bottom shelf 53 may be finished with, e.g., black oil paint and shiny lacquer e.g., ML Campbell. The circular side wall 59, the top, middle and bottom shelves 51, 52, 53, and the back panel 57, may be put together in any appropriate configuration to form the base 50 of the gaming table 10, and may be covered with any appropriate material, for example, metal, fabric or plastic laminate. Furthermore, the gaming table 10 may be finished with any appropriate stain, tint or color, e.g., with polyester. Additionally, the base 50 may be configured for an open base table as well. For example, a stretcher bar is used to connect table legs and may be used as storage for RFID and computer hardware. Furthermore, depending upon the number, placement and use of the RFID antennas 22, a gaming table may be configured so that it is not necessary to include the cup shield 21. As should be readily apparent to one of ordinary skill in the art, many other configurations of the gaming table are possible without departing from the scope according to the present invention.

Figure 5:
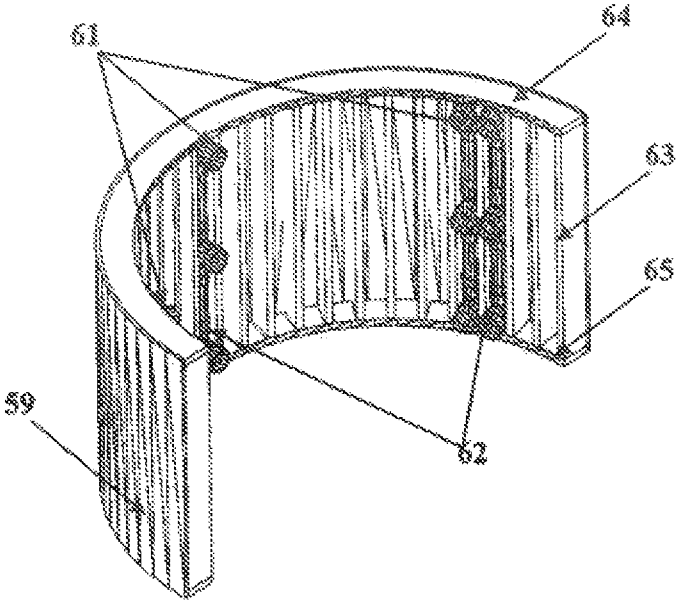
FIG. 5 shows a perspective view of a side wall of the base.

As shown in FIG. 5, the circular side wall 59 includes pipes 61 configured to insulate the electrical wirings 45, 46, 47 (shown only in FIG. 2A). Each of the pipes may have three holes for receiving the electrical wirings 45, 46, 47. The pipes 61 are configured to contain, insulate and shield AC wiring (e.g. power supply cables), RFID wiring (e.g. antenna cables), and data wiring (e.g. network cables). In one embodiment, the pipes 61 are coated or painted with a pre-formulated coating or paint to limit the electromagnetic interference produced by the AC wiring, RFID wiring, and/or data wiring. In such a configuration, the coating or paint protects the RFID system from radio frequency interference and/or electromagnetic interference created by whatever wiring system is located within pipes 61. In one particular embodiment, the pre-formulated coating or paint is a water-based, conductive paint, with a copper composition. In another embodiment, the pre-formulated coating or paint comprises a water-based shielding material that is interspersed with copper and/or ferrite particles.

Additionally, the pipes may be used to segregate the three families of cables. AC power is present in the gaming table 10. AC cables for power supplies (or transformers) may be needed to power equipment and devices such as the LCD display 43, the card shuffler 24, the RFID antenna 22, the bill validator 26, computers, etc. The magnetic harmonics created by AC cables may disturb the RFID antenna 22. It is preferred that the three families of wirings are arranged separately in the gaming table 10. The pipes 61 may protect the wirings for better efficiency, and may help prevent strong electromagnetic disturbances for the antennas. Pipes 61 may be made of PVC or copper, for example, to protect the antenna cables. Pipes 61 may be installed in any appropriate manner and networked within and around the table base, for example, in the circular side wall 59 perpendicular to the bottom shelf 53. Pipes 61 may help secure and organize the cables and protect them from harm. Also, base 50 may be built based on a structure comprising vertical columns of appropriate size, e.g., 63¾" tall×4" wide, an upper semicircular component 64 and a lower semicircular component 65 of the same width and material. Once the piping system has been finished, the interior part of the base may be covered with an appropriate material, e.g., ⅜" Luan plywood (not shown). The base may then be painted to cover the bottom area with, e.g., oil paint, and then finished with, for example, ML Campbell shiny lacquer.

The gaming table 10 may have two cleats (not shown), fabricated of any appropriate material of, e.g., 1" medium-density fiberboard (MDF), and finished with any appropriate material, e.g., plastic laminate and oil paint, on the interior side. One of the cleats may be attached to the upper semicircular component 64 of the base. The other cleat may be attached to the tabletop 20.

The gaming table 10 may be fitted with aprons (not shown), i.e., illumination rails, installed on the exterior of the base 50. The illumination rails may be built in any appropriate fashion, e.g., with two arcs of 1" MDF covered with, for example, a plastic or metallic laminate on the exterior face, and may be painted on the other surfaces. The gaming table may also include a lighted foot rest rail, luminarias, and decorations with different colors of lights, or other illuminated objects and parts.

Figures 6A, 6B, 6C:
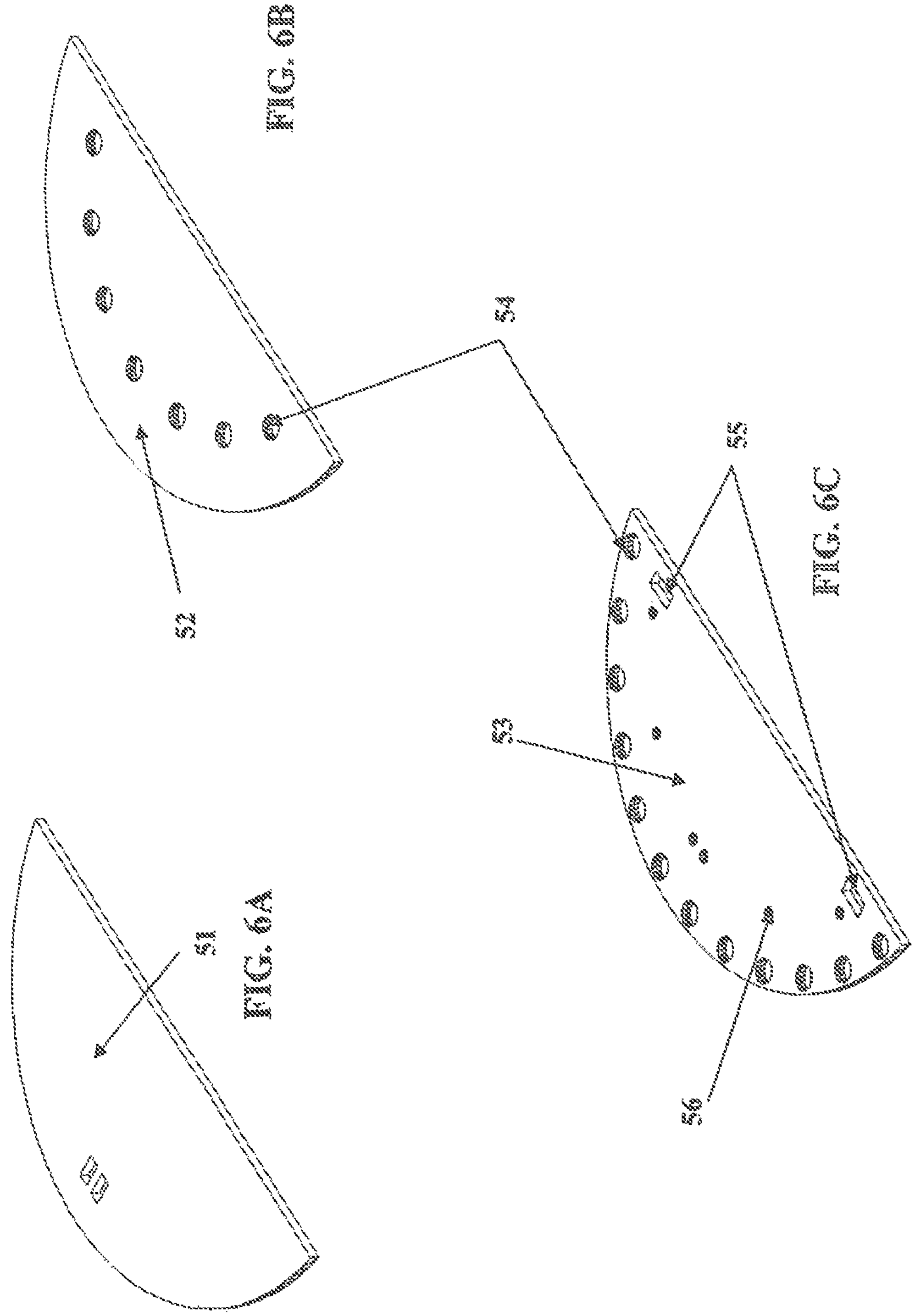
FIG. 6A shows a perspective view of a top shelf of the base.
FIG. 6B shows a perspective view of a middle shelf of the base.
FIG. 6C shows a perspective view of a bottom shelf of the base.

As shown in FIGS. 6A, 6B and 6C, the base 50 may be fabricated with a top shelf 51, a middle shelf 52 and a bottom shelf 53. In the illustrated embodiment, bottom shelf 53 has two holes 55 configured to receive two electrical boxes, and a plurality of additional holes 56 configured for wiring openings. These shelves may be covered with any suitable material, e.g., a plastic laminate. In particular, the middle shelf 52 and bottom shelf 53 may have a plurality of openings (holes) 54 configured to ventilate the heat emitted from electrical equipment, devices and wirings to the outside of the table.

Accordingly, the present gaming table has advantages for accommodating electronic equipment, including a RFID tracking system, without electromagnetic interferences within the RFID system. Other advantages include allowing ventilation and cooling of electronic/electrical equipment, elimination of signal interference of RFID transmitter and specially-built areas for items such as a shuffler and a bill validator that are ergonomically placed for dealer convenience and comfort while preventing any possible cheating.

What has been described are only some examples of a gaming table and method for making the gaming table according to preferred embodiments of the present invention. Accordingly, it is to be understood that various and numerous other arrangements may be devised by one skilled in the art without departing from the spirit and scope of the present invention as limited only by the accompanying claims.

What is claimed is:

1. A gaming table comprising:
- a tabletop having a top and a bottom surface, said top surface being configured to receive gaming accessories;
- a base connected to and configured to support the tabletop;
- at least one electrical wire located at least one of, within the tabletop, near the tabletop, within the base, near the base, or any combination thereof;
- at least one detector located within the top surface of the tabletop, said detector configured to communicate with the gaming accessories; and
- wherein at least a portion of the top surface of said tabletop proximate said at least one detector is painted with a pre-formulated paint, said paint is adapted to protect the at least one detector against electromagnetic and radio frequency interferences, limit a reading field of the at least one detector without closing a loop around the at least one detector, and prevent detuning of the at least one detector.

2. The gaming table of claim 1, further comprising:
- at least one bill validator located on the tabletop and within reach of a dealer;
- at least one radio frequency identification (RFID) float tray configured to store the gaming accessories, the RFID float tray being located on the tabletop; and a card shuffler located on the tabletop.

3. A gaming table comprising:
- a tabletop having a top and a bottom surface, said top surface being configured to receive gaming accessories;
- a base connected to and configured to support the tabletop;
- at least one electrical wire located at least one of, within the tabletop, near the tabletop, within the base, near the base, or any combination thereof;
- at least one detector located within the top surface of the tabletop, said detector configured to communicate with the gaming accessories; and
- at least one cup shield positioned on the bottom surface of said tabletop and located proximate to the at least one detector, said at least one cup shield being painted or coated with a pre formulated paint or coating, said cup shield being configured to prevent communication with said at least one detector outside a reading field of the at least one detector, said cup shield being configured to shield and protect the at least one detector from electromagnetic interference (EMI) and radio frequency interference (RFI), said cup shield being configured to prevent detuning of said at least one detector,
- wherein at least a portion of the top surface of said tabletop proximate said at least one detector is painted with a pre-formulated paint, said paint is adapted to protect the at least one detector against the electromagnetic and radio frequency interferences, limit the reading field without closing a loop around the at least one detector, and prevent detuning of the at least one detector.

4. The gaming table of claim 3, wherein the base comprises:
- at least one side wall connected to a back panel;
- at least one shelf connected to the at least one side wall and the back panel;
- wherein the back panel and the at least one shelf have a plurality of openings configured to ventilate heat from inside the base to outside of the table.

5. The gaming table of claim 4, wherein the tabletop has at least one cutout configured to receive at least one of a radio frequency identification (RFID) float tray, a bill validator, a liquid crystal display (LCD) module, an antenna, or any combination thereof.

6. The gaming table of claim 3, wherein the gaming accessories comprise at least one of, gaming chips, playing cards, dice, or any combination thereof.

7. A gaming table comprising:
- a tabletop having a top and a bottom surface, said top surface being configured to receive gaming accessories;
- a base connected to and configured to support the tabletop;
- at least one electrical wire located at least one of, within the tabletop, near the tabletop, within the base, near the base, or any combination thereof;
- at least one detector located within the top surface of the tabletop, said detector configured to communicate with the gaming accessories; and
- a first pipe located in the base, the first pipe being configured to at least one of, isolate, insulate, shield, or any combination thereof, at least one AC wire,
- wherein at least a portion of the top surface of said tabletop proximate said at least one detector is painted with a pre-formulated paint, said paint is configured to protect the at least one detector against electromagnetic and radio frequency interferences, limit a reading field of the at least one detector without closing a loop around the at least one detector, and prevent detuning of the at least one detector.

8. The gaming table of claim 7, further comprising a second pipe located in the base, the second pipe being configured to at least one of, isolate, insulate, shield, or any combination thereof, at least one RFID wire.

9. The gaming table of claim 8, further comprising a third pipe located in the base, the third pipe being configured to at least one of, isolate, insulate, shield, or any combination thereof, at least one data transmission wire.

10. A gaming table comprising:
- a tabletop having a top and a bottom surface, the top surface being configured to receive gaming accessories, the top surface defining an exchangeable insert bed;
- a base connected to and configured to support the tabletop;
- at least one detector located within the top surface of the tabletop, said detector configured to communicate with at least one of the gaming accessories; and
- a table top exchangeable insert configured to be located within the exchangeable insert bed, wherein at least a portion of said table top exchangeable insert proximate to the at least one detector is painted with a pre-formulated paint, wherein the paint is adapted to at least one of protect the at least one detector against electromagnetic or radio frequency interferences, limit a reading field of the at least one detector without closing a loop around the at least one detector, or prevent detuning of the at least one detector.

11. The gaming table of claim 10, wherein the exchangeable insert bed is a recessed area defined by the top surface of the tabletop.

12. The gaming table of claim 11, wherein a depth of the exchangeable insert bed is substantially the same as a thickness of the table top exchangeable insert.

13. The gaming table of claim 10, wherein the table top exchangeable insert defines an arcuate perimeter portion and a substantially collinear perimeter portion.

14. The gaming table of claim 13, wherein the arcuate perimeter portion and the substantially collinear perimeter portion generally define a half circle.

15. The gaming table of claim 10, wherein the exchangeable insert bed is sized and positioned such that removal of the table top exchangeable insert from the exchangeable insert bed does not necessitate removal of any of the gaming accessories received within the top surface.

16. The gaming table of claim 10, further comprising:

at least one electrical wire located at least one of, within the tabletop, near the tabletop, within the base, near the base, or any combination thereof.

17. The gaming table of claim 10, wherein the table top exchangeable insert comprises at least one hollow area sized to correspond to the at least one detector such that each hollow area is configured to fit over a corresponding at least one detector located within the top surface of the tabletop when the table top exchangeable insert is located within the exchangeable insert bed.

18. The gaming table of claim 10, further comprising at least one cup shield positioned on the bottom surface of the tabletop and located proximate to the at least one detector, the at least one cup shield being painted or coated with a preformulated paint or coating, the cup shield being configured to at least one of prevent communication with the at least one detector outside a reading field of the at least one detector, to shield or protect the at least one detector from electromagnetic interference (EMI) or radio frequency interference (RFI), or to prevent detuning of the at least one detector.

19. The gaming table of claim 10, wherein the table top exchangeable insert comprises indicia specific to a game utilized in a gaming location, and wherein the tabletop is devoid of any indicia specific to the game.

20. The gaming table of claim 19, wherein the an indicia of the table top exchangeable insert is aligned with a corresponding at least one detector located within the top surface of the tabletop when the table top exchangeable insert is located within the exchangeable insert bed.

21. The gaming table of claim 10, wherein the detector comprises an antenna.

* * * * *